United States Patent [19]
Suzuki

[11] Patent Number: 5,282,047
[45] Date of Patent: Jan. 25, 1994

[54] DUAL INPUT ENGRAVING APPARATUS FOR PRODUCING ENGRAVINGS BY MULTIPLE ENGRAVING TECHNIQUES

[76] Inventor: Akira Suzuki, 19-9, Motogou 3-chome, Kawaguchi-city, Saitama-prefecture, 332, Japan

[21] Appl. No.: 762,996

[22] Filed: Sep. 20, 1991

[51] Int. Cl.$^5$ .................. H04N 1/00; B41C 1/045
[52] U.S. Cl. .................................... 358/299; 358/298
[58] Field of Search ............... 358/299, 298, 456; 409/207, 208; 346/139 C

[56] References Cited

U.S. PATENT DOCUMENTS 3,004,100 10/1961 Taudt .
3,930,924 1/1976 Oka et al. .
4,052,739 10/1977 Wada et al. .

Primary Examiner—Edward L. Coles, Sr.
Assistant Examiner—Scott A. Rogers
Attorney, Agent, or Firm—Armstrong, Westerman, Hattori, McLeland, & Naughton

[57] ABSTRACT

An engraving method is switched from line engraving to dot engraving (or vice versa) at a boundary line at every horizontal scanning by generating and controlling switching signals by means of an engraving discrimination plate. An engraving is performed while a sweeping operation is being performed in a direction (X direction) substantially parallel to a long side of a portion of a card requiring engraving. Since the number of horizontal sweepings are reduced considerably in comparison with the conventional method, the time required for engraving can be shortened. Since the number of vibrations of the engraving table, which are the biggest obstacle for achieving light weight, is reduced in accordance with the reduction in the number of the above-described horizontal sweepings, the engraving table can be produced more light in weight. As a result, a higher speed of the movement of the engraving table can be achieved, thus making it possible to further shorten the time required for engraving.

6 Claims, 2 Drawing Sheets

DUAL INPUT ENGRAVING APPARATUS FOR PRODUCING ENGRAVINGS BY MULTIPLE ENGRAVING TECHNIQUES

BACKGROUND OF THE INVENTION

1. Field of the Invention

The present invention relates to an image engraving method whereby an image of a license, a card holder or the like is engraved on synthetic paper or a card surface. More particularly, the present invention relates to an image engraving method for improving the engraving efficiency of an engraving machine when identification cards or the like for use in public organizations, banks or the like are produced by engraving a photograph of the face of a card holder or other information (image) on synthetic paper or a card surface.

2. Description of the Related Art

Engravings made on these kinds of conventional cards are for photographs of the face only. A specific example of the construction of an apparatus used for engraving such cards has already been proposed. An example of such an image engraving method is illustrated as a portion of FIG. 2, which also illustrates the apparatus of the present invention.

In FIG. 2, reference numeral 1 denotes an engraving table which reciprocates a given distance horizontally from side to side by a driving motor (not shown); and reference numeral 2 denotes a card for engraving, e.g., a thin plate of vinyl chloride. Black, blue, or other paint is strongly and fixedly applied beforehand on a surface 11 of card 2 where an engraving of a photograph of a face, characters or the like will be made. Reference numeral 3 denotes an engraving needle (stylus); reference numeral 4 denotes an engraving needle driving device for stylus 3. Components 1, 2, 3 and 4 are common to known engraving devices. The additional elements of FIG. 2 comprise a portion of the present invention. Reference numeral 5 denotes an engraving method discrimination plate of the present invention which reciprocates from side to side together with the engraving table 1. A photodetector unit consisting of a light source 12 provided on one side of the engraving discrimination plate 5 and a phototransistor 6 or the like located on the opposite side of engraving discrimination plate 5. Reference numeral 7 denotes an electronic changeover switch which performs switching according to the output of the photodetector unit. Reference numeral 8 denotes a video camera which generates its video signal and scans a video image (a face of a person or photograph) in synchronization with the movement of the engraving table 1. Camera 8 can alternatively be replaced with a photoelectric converter consisting of a light source, a lens, slits, photoelectric elements, a card scanning apparatus or the like. Reference numeral 9 denotes a video camera or a photoelectric converter for the nondetailed portion of the engraving (characters, symbols, etc.) which is the remainder of the engraved image with the exception of the part consisting of the video image. Video camera or photoelectric converter 9 also scans in synchronization with the movement of the engraving table 1. The output of the video cameras or photoelectric converters 8 and 9 is switched by a switch 7 and output to driving apparatus 4. Reference numeral 10 denotes a modulating apparatus.

In addition to the side-to-side reciprocative movement, the engraving table 1 must be fed in a back and forth direction at right angles to the reciprocative movement. This may be performed by moving the engraving stylus 3 back and forth. The illustration of those devices is omitted. To make the return of the reciprocative movement of the engraving table fast, time is allocated, for example, in such a manner that ¾ of one reciprocation is for the forward motion and ¼ thereof is for the return. The time required for the engraving table 1 to make one reciprocation is about 0.8 seconds.

Forgery and alteration of passports, licenses, and identification certificates have occurred many times in recent years. Thus, engraving characters, symbols, etc. in addition to the photograph of the face has become necessary to prevent problems. A discrimination between suitable engraving methods must be made in each case.

There are two methods for engraving cards: line engraving and dot engraving. The merits and demerits of each are shown below:

|  | Line Engraving | Dot Engraving |
|---|---|---|
| Strokes of engraving needle | Long | Short |
| Influence of flatness of card | Great | Small |
| Visual offensiveness of engraving lines | Great | Small |
| Power required for engraving | Small | Large |

Generally, line engraving is performed in that part where there are characters, symbols, etc., which can be represented by black and white (two levels), and dot engraving is performed in that part where half tones, such as a photograph of a face or the like, are needed.

One method which has been devised for engraving on a card after a discrimination has been made between these two engraving methods is the conventional engraving sweeping method shown in FIG. 3.

In FIG. 3, the slanted lines 14 and 16 indicates scanning lines of an engraving needle (stylus). Engraving is accomplished when a sweeping operation is performed sequentially from 1 to n, and again from n+1 to m. The solid and broken lines of the scanning lines indicate the difference between the contents to be engraved. The solid lines 14 indicates that portion which can be represented by black and white (two levels), such as characters, symbols, patterns, etc., namely, where line engraving should be performed. The broken line 16 indicates that portion where there are many half tones, such as a photograph of a face or the like, namely, where dot engraving should be performed. As described above, a boundary line 18 for discriminating the engraving contents is generally parallel to the short side of the part requiring engraving in the card. Therefore, as shown in FIG. 3, if an engraving is performed while sweeping in a direction substantially parallel to the short side and the boundary line 18, it is possible to manage with only one time, between n and n+1, to switch the engraving method. The above-described conventional image engraving apparatus can be used without modifying it too much. However, sweeping parallel to the short side direction requires a greater number of shorter sweeps than sweeping parallel to the long side.

However, in the production of various kinds of engraved cards, the need for shortening the time required for engraving has been high for a long time. To meet this demand, a higher-speed horizontal reciprocative movement of the engraving table must be achieved. One effective means for achieving this is to make the engraving table lighter. But, light weight is limited by the necessity to produce a sturdily constructed engraving table.

Accordingly, an object of the present invention is to solve the above-mentioned problems of the prior art by shortening the time required for engraving without diminishing the engraving quality.

BRIEF SUMMARY OF THE INVENTION

To this end, according to the present invention, there is provided an image engraving method comprising the steps of engraving in a scanned method by the movement of the engraving needle and a plate to be engraved on and engraving two or more portions whose boundary lines are clear by switching engraving methods for each portion, wherein the engraving method is switched at the boundary line which intersects with the scanning direction at every engraving scanning.

When an attempt is made to shorten the required engraving time, as described above, the horizontal reciprocative movement of the engraving table is usually increased. However, the greatest obstacle for achieving light weight is vibration of each mechanism related to the engraving table. Vibration of the engraving table itself exerts the worst influence. That is why the present inventor has researched this point and found that it is effective to make the number of reciprocative movements as small as possible because the vibration occurs at a point where the speed changes, i.e., at both ends of the reciprocative movement.

In the present invention, as shown in FIG. 1, the engraving method is switched from line engraving to dot engraving (or vice versa) at the boundary line L at every horizontal scanning. The generation and control of this switching signal is performed by the engraving discrimination plate 5 of FIG. 2.

The engraving discrimination plate 5 is half transparent and half opaque and reciprocates from side to side together with the engraving table 1. The photodetector consists of a light source 1100 and photoelectric converting elements 6 which are disposed in such a manner as to face each other with the engraving separation plate 5 sandwiched therebetween. The photodetector generates an output at that portion where the engraving discrimination plate 5 is transparent, causing the switch 7 to be connected to, for example, the lower side thereof contact 7a. On the other hand, in that portion where the engraving separation plate 5 is opaque, the output is lost, causing the switch 7 to be connected to the upper side thereof. As described above, accurate discrimination between the transparent portion and the opaque portion of the engraving separation plate 5 enables the switching of the engraving method of the present invention to be performed very easily and smoothly.

Although the above description provides an example of switching the engraving method one time in one horizontal scanning, it is possible to switch the engraving method two or more times.

As described above, if during every horizontal scanning, the engraving method is switched at the boundary portion which intersects with a scanning direction, an engraving operation can be performed while sweeping is being performed in a direction substantially parallel to the long side of a portion of a card requiring engraving. Therefore, the number of horizontal sweepings can be considerably reduced in comparison with the conventional method, and the time required to engrave cards can thus be shortened. Since the number of vibrations caused by the movement of the engraving table, which is the biggest obstacle for achieving light weight, is reduced in accordance with the reduction in the number of the above-described horizontal sweepings, the engraving table can be produced more light in weight. As a result, a higher speed of the movement of the engraving table can be achieved, thus making it possible to further shorten the engraving time.

These and other objects, features and advantages of the present invention will become clear when reference is made to the following description of the preferred embodiments of the present invention, together with reference to the accompanying drawings.

DESCRIPTION OF THE PREFERRED EMBODIMENT

The present invention will be explained below in more detail with reference to an embodiment shown in the accompanying drawings. The present invention is not limited to this embodiment.

Figure 1:
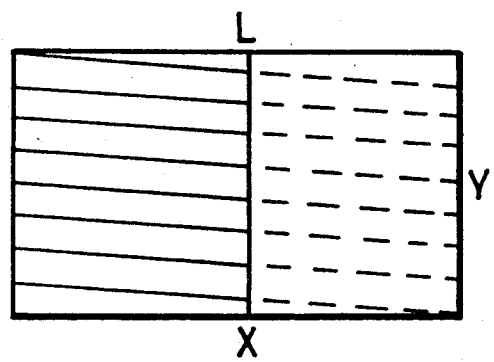
FIG. 1 is a view showing an engraving sweeping method of the present invention.
Figure 3:
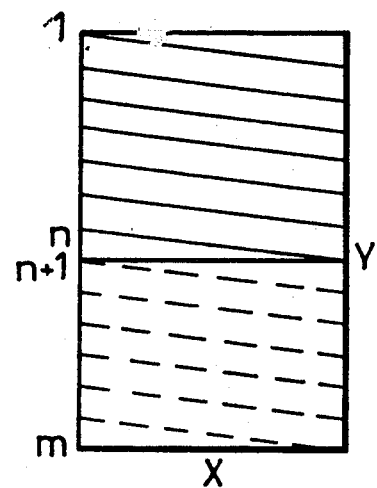
FIG. 3 is a view showing a conventional engraving sweeping method.

FIG. 3 shows a conventional engraving sweeping method. FIG. 1 shows an engraving sweeping method of the present invention. Assume now that an engraving for a given area is performed by a horizontal sweeping of the engraving table 1 in the X direction and by the sweeping of the engraving needle 3 in the Y direction 90° degrees different from the X direction. The sweeping speed in the Y direction is determined by the sweeping speed in the X direction and given by an equation $Y=DX$, where D is the density of the scanning lines and corresponds to a pitch of lines. For example, let $D=1/6$ mm. This indicates that 6 reciprocative movements along the X direction cause the needle to move 1 mm along the Y direction.

In the method shown in FIG. 3, since an engraving is performed by sweeping sequentially from 1, n+1, ..., to m, if it is assumed that $D=1/6$ mm, the length of a portion requiring an engraving in the X direction of a card is 45 mm, and the length in the Y direction is 65 mm, the number of horizontal sweepings is $65 \times 6 = 390$. In contrast, in the sweeping method shown in FIG. 1 according to the present invention, it is possible for the number of horizontal sweepings to be $40 \times 6 = 240$.

The solid line 14 and the broken line 16 in FIGS. 1 and 3 indicate the difference in the contents to be engraved. The portion with solid line 14 indicates a portion which can be represented by black and white (two levels), such as characters, symbols or the like. The broken line 11 indicates a portion where there are many half tones, such as a photograph of a face. It is required that these kinds of cards be engraved after these two portions are distinguished.

Figure 2:
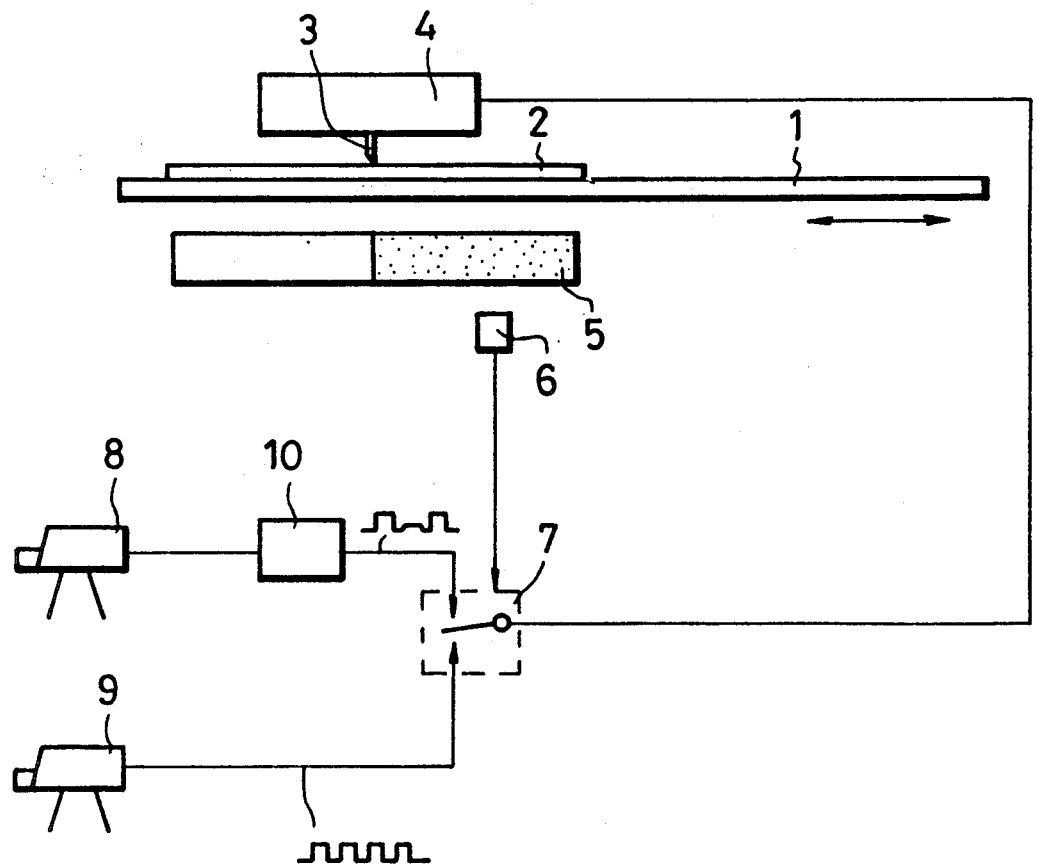
FIG. 2 is a view showing the construction of an image engraving apparatus.
Figure 4:
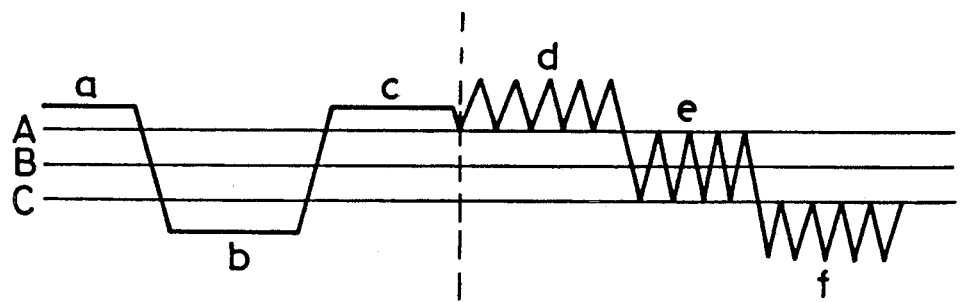
FIG. 4 is a trace view showing the movements of an engraving needle during engraving.

FIG. 4 shows the trace of movements of the engraving needle 3 during engraving: reference character A denotes the line of level black; reference character B denotes the line of intermediate levels; and reference character C denotes the line of level white. The broken line in the center of the figure denotes a switching point. The left side of the switching point indicates line engraving and the right side thereof indicates dot engraving. In the case of line engraving, the movement of the engraving needle 3 is upward and downward vibrations at two levels depending upon whether the original article is black or white. In the case of dot engraving, the movement thereof is upward and downward vibrations at three levels depending upon whether original article is black, gray (intermediate tone) or white. Furthermore, triangular or sawtooth waves whose frequency is, for example, 1 KHz, are made to vibrate in such a manner as to be superimposed at a given amplitude generated by a modulation apparatus 10 of FIG. 2.

The portions of "a", "c" and "d" are at level black. Levels "a" and "c" are black having an allowance with respect to level A. "d" is the very limit of black having no allowance because the lower end of the triangular waves contacts level A. The portion of "e" is gray, intermediate between black and white. The portions of "b" and "f" are white. Level "b" is white having an allowance with respect to C, and "f" is the very limit of white having no allowance because the upper end of the triangular waves contacts level C.

Therefore, if, for data of characters or symbols, line engraving is performed, and for a photographic image of a face, dot engraving is performed, characters or symbols are in a level-saturated color of only black and white and can be displayed clearly and a photograph of a face can be displayed in light and shades of continuous intermediate colors (gray), in which both black and white are not saturated. Thus, high-quality image engraving can be performed.

The same signal level may be used for both line and dot engraving. Triangular or sawtooth waves are superimposed in the portion of the photograph only.

As has been explained above, according to the image engraving method of the present invention, since the number of horizontal sweepings are reduced considerably in comparison with the conventional method, the time required for engraving can be shortened. Since the number of vibrations of the engraving table, which are the biggest obstacle for achieving light weight, are reduced in accordance with the reduction in the number of the above-described horizontal sweepings, the engraving table can be produced more light in weight. As a result, a higher speed of the movement of the engraving table can be achieved, thus making it possible to further shorten the time required for engraving.

Many different embodiments of the present invention may be constructed without departing from the spirit and scope of the present invention. It should be understood that the present invention is not limited to the specific embodiments described in this specification, and is only limited in the appended claims.

What is claimed is:

1. An image engraving apparatus for engraving an image in an engravible medium, said image formed from a plurality of parallel sweeps of an engraving stylus across said engravible medium, said image having a first image portion corresponding to a first image input and formed by a first engraving technique and a second image portion corresponding to a second image input and formed by a second engraving technique, the apparatus including:
   an engraving table for supporting said engravible medium, and reciprocable in a first direction to cause said parallel stylus sweeps,
   engraving method discrimination means operatively connected to said table for sensing said reciprocation in said first direction and for providing a switching signal at least once during each said reciprocation,
   engraving stylus driving means for moving said stylus in a second direction perpendicular to said first direction and for controlling the engagement of said stylus with said medium to operate said stylus in said first engraving technique or said second engraving technique during said reciprocation, and
   switching means operatively connected to said first and second image inputs, said engraving method discrimination means and said stylus driving means, for switching said driving means between said first engraving technique and said second engraving technique and for correspondingly switching between said first and second image inputs in response to said switching signal.

2. The apparatus of claim 1, wherein:
   said first and second image portions meet at a boundary,
   each sweep of said stylus crosses said boundary, and
   said switching signal is generated when said stylus crosses said boundary.

3. The apparatus of claim 2, wherein:
   said first engraving technique is line engraving and said second engraving technique is dot engraving.

4. A method for engraving an image having a first image portion formed by a first engraving technique and a second image portion formed by a second engraving technique, formed from a plurality of parallel sweeps of an engraving stylus across an engravible medium, comprising the steps of:
   reciprocating said engravible medium in a first direction to cause said parallel stylus sweeps,
   sensing said reciprocation in said first direction and providing a switching signal at least once during each said reciprocation,
   moving said stylus in a second direction perpendicular to said first direction,
   controlling the engagement of said stylus with said medium to operate said stylus in said first engraving technique or said second engraving technique during said reciprocation, and
   switching between said first engraving method and said second engraving method in response to said switching signal.

5. The method of claim 4, wherein:
   said first and second image portions meet at a boundary,
   each sweep of said stylus crosses said boundary, and
   said switching signal is generated when said stylus crosses said boundary.

6. The method of claim 4, wherein:
   said first engraving technique is line engraving and said second engraving technique is dot engraving.

* * * * *